MACHINE FOR GATHERING, STACKING AND TRANSPORTING HAY

Original Filed Oct. 10, 1968 2 Sheets-Sheet 1

RAYMOND R. CARSON
INVENTOR.

BY James D. Givman
ATT'Y

MACHINE FOR GATHERING, STACKING AND TRANSPORTING HAY

Original Filed Oct. 10, 1968 2 Sheets-Sheet 2

RAYMOND R. CARSON
INVENTOR.

BY James L. Girman
ATT'Y

United States Patent Office

Re. 27,706
Reissued July 24, 1973

27,706

MACHINE FOR GATHERING, STACKING AND TRANSPORTING HAY

Raymond R. Carson, 1374 C St.,
Independence, Oreg. 97351

Original No. 3,538,696, dated Nov. 10, 1970, Ser. No. 766,532, Oct. 10, 1968. Application for reissue Nov. 8, 1971, Ser. No. 196,702
Int. Cl. A01d *85/00*
U.S. Cl. 56—350 9 Claims

Matter enclosed in heavy brackets [ ] appears in the original patent but forms no part of this reissue specification; matter printed in italics indicates the additions made by reissue.

ABSTRACT OF THE DISCLOSURE

A machine for gathering hay from a windrow and stacking it on a superimposed platform on the machine for transportation to a storage building, barn or feed lot. The machine is preferably, though not restrictively, of a trailer type including self-contained power driven circumferentially rotatable sweepers or arms for stacking the gathered hay in a controlled build-up over the top surface of the platform.

The objects of the invention are:

To provide a machine as above described which is provided with ground engaging and steerable wheels suspended from a framework or chassis upon which a circular platform is mounted and through which and onto the top thereof, the gathered hay is impelled from the windrow by a pick-up conveying means.

To provide self-contained power driven means for rotating the sweepers circumferentially over the platform to insure loading and distributing of the hay uniformly therearound into a finished stack.

To provide means mounting the sweepers in a manner that will enable them to automatically rotate in gradual elevated horizontal planes as the height of the hay load on the platform increases, and wherein the sweepers are selectively removable for slidably dumping the hay load upon arrival at its destination.

To provide a machine of the character described which is of simple, efficient, durable construction, comprising interchangeable parts readily assembled into an operative machine and disassembled for shipping or storage purposes.

To provide a machine wherein the steerable ground-engaging wheels are readily attachable to a tractor by a simple draw bar.

To provide a machine which is completely mechanized for moving hay by a single operator from a field to its destination and thus avoid the expense of labor of intermediate handling as heretofore.

The foregoing and other objects and advantages which will become subsequently apparent reside in the details of construction and operation as more fully hereinafter described and claimed, reference being had to the accompanying drawings forming a part hereof and in which:

Figure 1:
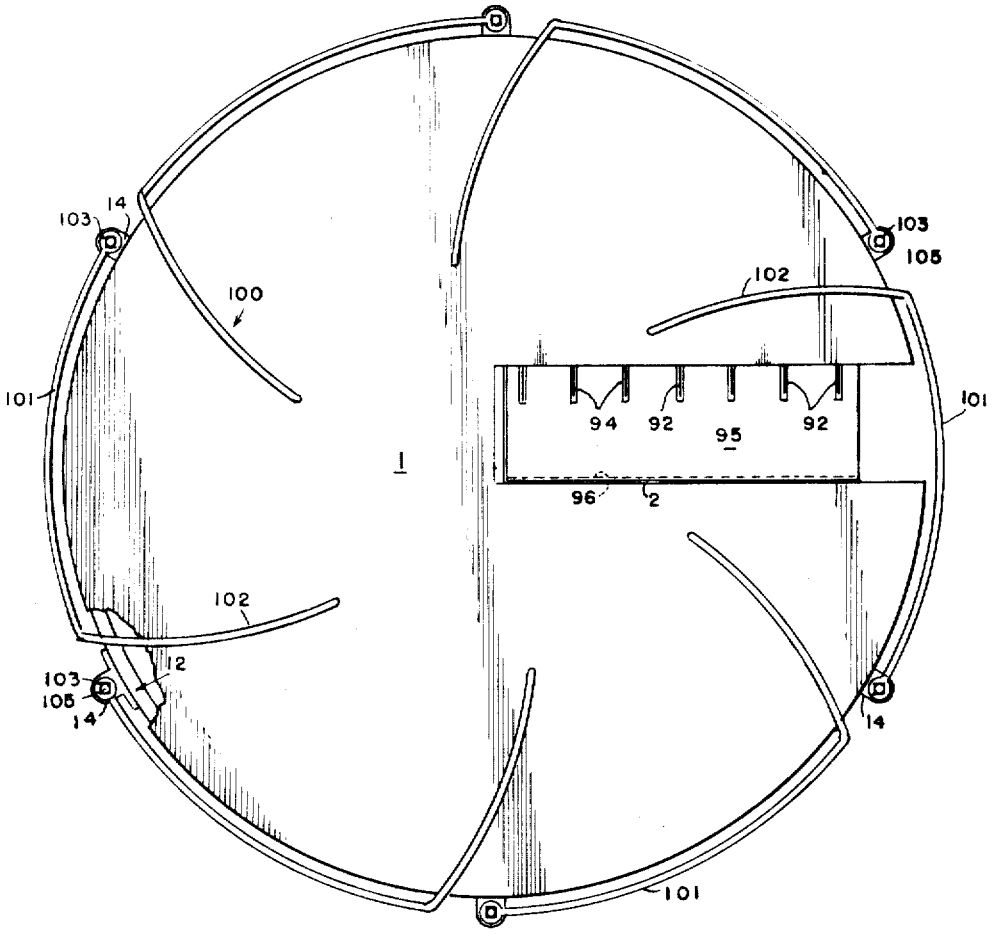
FIG. 1 is a top plan view of a hay gathering and transporting machine made in accordance with my invention with a small fragment of its circular loading platform broken away for convenience of illustration.

With continuing reference to the drawings wherein like reference numerals designate like parts and particularly FIG. 1 thereof, reference numeral 1 indicates a circular loading platform having a radial opening 2 therethrough for movement of hay gathered from a windrow onto the top of the platform.

Figure 2:
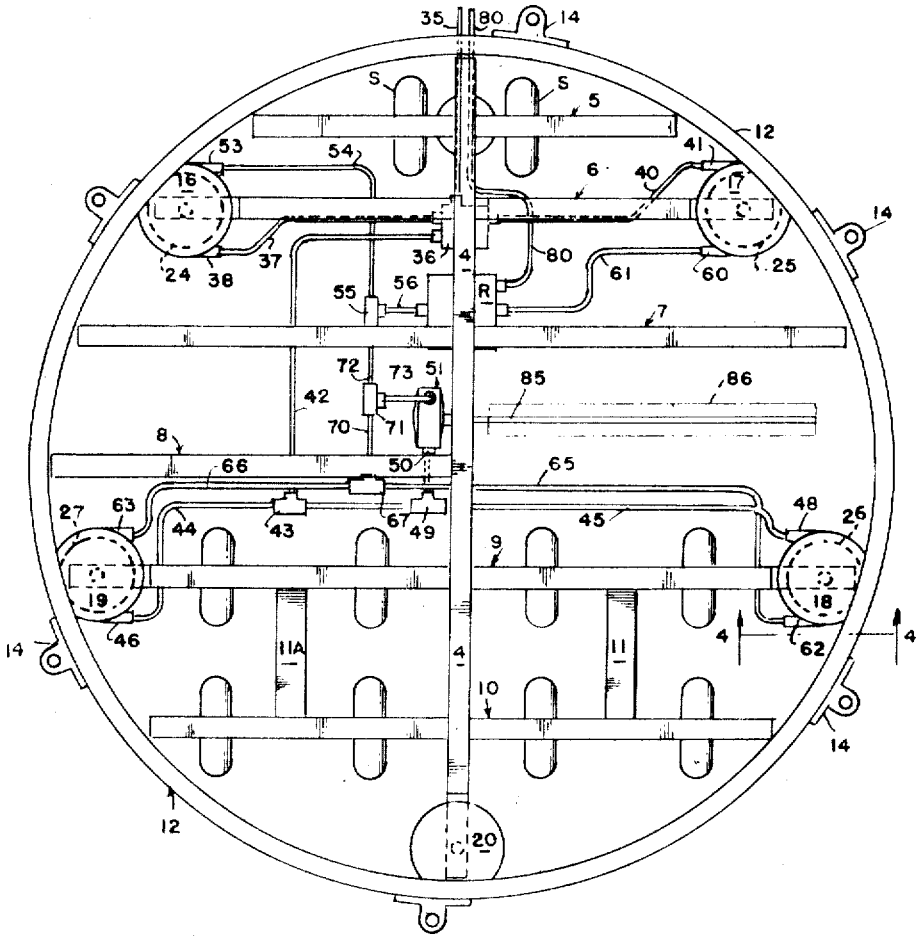
FIG. 2 is a top plan view of the wheel supported chassis of the machine and an annular sweeper-arm carrying frame rotatable by hydraulic motors carried by the chassis.

As best illustrated in FIG. 2, the horizontal chassis of the machine comprises at least one longitudinal frame member 4 having welded thereto pairs of aligned lateral members indicated generally at 5, 6, 7, 8, 9 and 10, all flush with the longitudinal member 4. All of these members may be of channel section, angle section, or I-beams as deemed necessary or desirable in accordance with good structural engineering practices. The chassis is supported upon two truck units indicated generally at 11–11A and by steering wheels S attachable by a draw-bar D to a towing vehicle such as a tractor, or the like, carrying a fluid pressure pump, neither of which is shown.

An annular frame member 12 of channel section surrounds the chassis frame and welded or otherwise secured to the web of the channel, at spaced intervals, are slide bearings 14.

The annular frame 12 is supported and rotatably driven in a clockwise direction by four horizontally disposed hydraulically driven wheels 16, 17, 18 and 19, and one idling wheel 20. Each of these wheels may be in the form of a steel disk whereby metal-to-metal cohesion is relied upon for driving engagement with the top flange of the annular frame 12, or the top surface of the wheels may be rubber covered if desired, or as a further alternative, rubber-tired wheels may be used.

Figure 4:
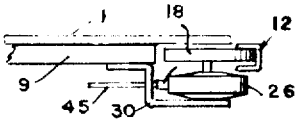
FIG. 4 is a sectional detail view taken approximately along the line 4—4 of FIG. 2.

As best illustrated in FIG. 4, the wheels 16–19 are driven respectively by identical hydraulic motors 24, 25, 26 and 27, mounted upon radially extending brackets 30 secured at their inner ends to the underside of the lateral frame members in any suitable manner.

Since the motors are identical and all operate in a clockwise direction a description of one will suffice for all.

Hydraulic pressure from the pump on the tractor is fed through a feed line 35, a distributor 36 and conduit 37 to the intake side 38 of hydraulic motor 24, by conduit 40 to intake side 41 of motor 25, by conduit 42, T-fitting 43 and branch conduits 44 and 45 to the intake 46 of motor 27 and intake 48 of motor 26 respectively. Pressure is also supplied from branch conduits 45 and T-fitting 49 to the intake side 50 of a vertically disposed hydraulic motor 51 for driving a pickup conveyor appearing through opening 2 in the platform 1 and which will be more fully hereinafter described.

Fluid pressure is returned from outlet 53 of motor 24 through conduit 54, T-fitting 55 and branch line 56 to a reservoir R. Pressure from the outlet 60 of motor 25 is returned through conduit 61 to the reservoir R. Fluid is returned from outlets 62 and 63 of motors 26 and 27 by conduits 65–66, T-fitting 67, branch line 70, T-fitting 71, branch conduit 72 and T-fitting 55, back to reservoir R. Exhaust pressure from motor 49 is returned to the reservoir R by branch line 73, T-fitting 71, branch conduit 72, and T-fitting 55.

Fluid pressure from the reservoir R is returned to the intake side of the pump, not shown, by conduit 80.

Figure 3:
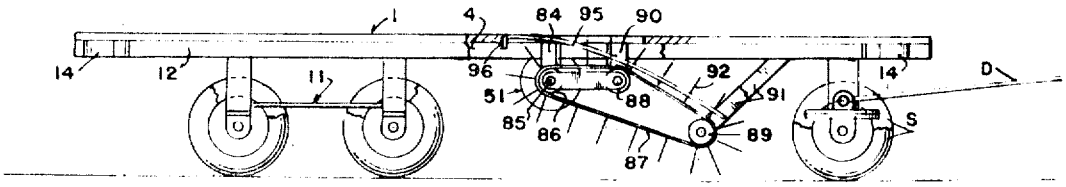
FIG. 3 is an elevational view of the right hand side of FIG. 2 with some parts omitted for clearness of illustration.

The motor 51 is mounted in any suitable manner as at 84 (FIG. 3) to the underside of platform 1 with the motor shaft 85 (FIG. 2) having a driving connection with one roller 86 (shown in broken lines) for the conveyor belt 87 (FIG. 3) entrained over driven rollers 88 and 89 journalled in bearing brackets 90 and 91 also secured to and depending from the underside of the platform 1. The conveyor belt 87 is provided with any desired number of pick-up tines 92 which travel rearwardly with the top run of the belt and extend upwardly through slots 94 in a deflector plate 95 extending forwardly and downwardly over the conveyor. The rearward margin 96 of plate 95 is bent downwardly as shown and therealong secured to the rear edge of the radial opening 2 in the platform 1 and flush with the top surface of the platform.

From the foregoing it will be readily apparent that during forward travel of the machine hay will be picked up from the ground and moved upwardly and rearwardly over plate 95 onto the platform 1 and into the path of orbital rotation of sweeper arms indicated generally at 100.

Figure 5:
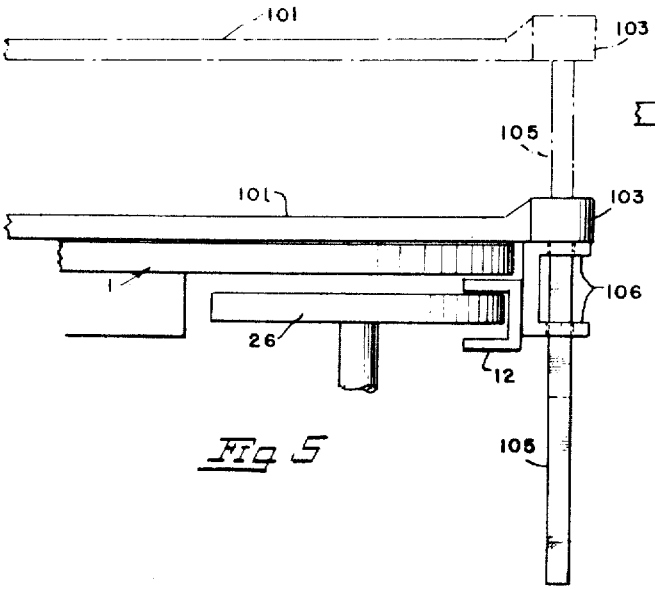
FIG. 5 is an elevational detail view of a typical sweeper arm and its mounting means.
Figure 6:
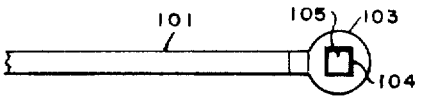
FIG. 6 is a fragmentary top plan view of FIG. 5.

As best illustrated in FIG. 5, each sweeper arm comprises a main body portion 101 whose reach corresponds to the circumferences of the platform 1. The free end of the body [1] *101* is bent inwardly into a raking arm 102. The opposite end of the body [1] *101* terminates in a head 103 (FIGS. 5 and 6) having a square opening 104 therethrough for securement to the top end of a shaft 105 of square section slidably mounted in aligned square openings through the spaced apart flanges of a bearing block 106. By this arrangement the sweeper arms are normally gravitationally maintained in their lowermost position by their heads 103 resting upon the top flange of the bearing blocks 106 but are free to slide upwardly with the build-up of accumulated hay upon the platform 1. In any such vertical movement the shafts 105 and hence the heads 103 are prevented from swinging outwardly from the edge of the platform and the shafts are also prevented from binding because of their two-point slidable support through the spaced apart flanges of the bearing brackets 106.

The rotational speed of the ring 12 and hence the sweeper arms 101–102 can be regulated by any suitable control valves (not shown) in circuit with the pressure and return conduits to and from the motors 24–27 and with those to the motor 51 of the pick-up conveyor.

Thus the ring 12 and conveyor can be operated simultaneously at the same speed or at different speeds as desired or necessary for optimum results.

What I claim is:

1. A hay gathering, stacking and transporting machine, comprising in combination:

a circular platform supported by ground-engaging idling wheels and steerable wheels, said platform having a radially disposed opening therethrough, a pick-up conveyor carried by the platform and depending downwardly and forwardly therefrom, power drive means carried by the machine and having a driving connection with said conveyor for picking up hay from the ground and moving it upwardly onto said platform, an annular frame surrounding said platform and rotatable relative thereto, power driven means carried by the platform and in driving engagement with said annular frame for imparting rotation thereto, sweeper arms carried by said annular frame and extending inwardly over the top surface of said platform whereby hay moved onto the platform by said pick-up conveyor is distributed over the platform in controlled build-up into stacked formation for transportation by the machine.

2. A hay gathering, stacking and transporting machine as claimed in claim 1 wherein said conveyor includes a belt entrained over at least two pulleys and having pick-up tines extending outwardly therefrom, and wherein said power driven means comprises hydraulic motors.

3. A hay gathering, stacking and transporting machine as claimed in claim 1 wherein said annular frame is of channel section rotatably supported by and having a driving connection with said power driven means.

4. A hay gathering, stacking and transtporting machine as claimed in claim 1 wherein said sweeper arms are mounted for free vertical sliding movement but held against rotational movement independent of their orbital movement relative to the platform.

*5. A hay stacking machine, comprising:*

*(a) a platform having a top surface for the building of a hay stack thereon, said platform having an opening therein;*

*(b) support means for supporting said platform above a supply of hay;*

*(c) transport means for picking said hay up from said supply and moving said hay to said platform surface through said opening; and*

*(d) means for moving said hay into a layer upon said platform surface and for moving said layer over said opening in said platform surface, whereby said moving layer of hay sweeps up said hay moved to said platform surface and forms a hay stack from the bottom thereof.*

*6. The hay stacking machine of claim 5 wherein said means for moving said hay into a layer and for moving said layer relative to said platform surface includes:*

*(a) a frame member;*

*(b) means supported by said support means for supporting said frame member and for moving said frame member relative to said platform; and*

*(c) means attached to said frame member for movement therewith and extending inwardly over said platform surface.*

*7. The hay stacking machine of claim 6, wherein:*

*(a) said frame member is of an annular shape; and*

*(b) said means for supporting said frame member and for moving said frame member relative to said platform includes means for rotating said annular frame member relative to said platform.*

*8. The hay stacking machine of claim 7, wherein:*

*(a) wheels for the movement of said platform over said supply of hay;*

*(b) said platform opening is generally radially disposed extending from adjacent the center of said platform to said annular frame;*

*(c) said transport means includes a pick-up conveyor carried by said platform and depending downwardly therefrom; and*

*(d) said means attached to said frame member and extending inwardly over said platform surface includes a plurality of circumferentially spaced sweeper arms each having a hay engaging portion extending generally radially inward from said frame member toward the center of said platform, said hay engaging portion of said sweeper arms being positioned for moving said hay into a layer upon said platform surface and for engaging said layer for rotation with respect to said platform whereby said rotating layer of hay sweeps up said hay moved to said platform surface and forms a hay stack from the bottom thereof.*

*9. A method of stacking hay comprising the steps of:*

*(a) supporting a platform having a top surface with an opening therein above a supply of hay;*

*(b) transporting hay from said supply to said platform surface through said opening;*

*(c) moving said hay transported to said platform surface into a layer; and*

*(d) moving said layer over said opening in said platform surface for sweeping up said hay moved to said platform surface and forming a hay stack from the bottom thereof.*

(References on following page)

References Cited

The following references, cited by the Examiner, are of record in the patented file of this patent or the original patent.

UNITED STATES PATENTS

| | | | |
|---|---|---|---|
| 1,002,438 | 9/1911 | Pedersen | 56—347 |
| 3,555,997 | 1/1971 | Van der Lely | 100—66 |
| 31,568 | 2/1861 | Stone | 56—346 |
| 2,766,576 | 10/1956 | Van der Lely | 56—345 |

| | | | |
|---|---|---|---|
| 3,331,199 | 7/1967 | Dechentreiter | 56—364 |
| 3,543,677 | 12/1970 | Van der Lely | 100—66 |
| 3,570,231 | 3/1971 | McCary et al. | 56—370 |
| 3,584,448 | 6/1971 | Martinmaas | 56—473.5 |

FOREIGN PATENTS

| | | | |
|---|---|---|---|
| 1,071,658 | 6/1967 | Great Britain | 56—345 |

RUSSELL R. KINSEY, Primary Examiner